United States Patent
Castilla et al.

(10) Patent No.: US 11,107,173 B2
(45) Date of Patent: Aug. 31, 2021

(54) USAGE DATA MANAGEMENT SYSTEM AND METHOD

(71) Applicant: SoundExchange, Inc., Washington, DC (US)

(72) Inventors: Edgar Castilla, Fairfax, VA (US); Reid Badgett, Arlington, VA (US); Christopher B. Yorks, Washington, DC (US)

(73) Assignee: SoundExchange, Inc., Richmond, VA (US)

( * ) Notice: Subject to any disclaimer, the term of this patent is extended or adjusted under 35 U.S.C. 154(b) by 234 days.

(21) Appl. No.: 15/040,473

(22) Filed: Feb. 10, 2016

(65) Prior Publication Data

US 2017/0228843 A1 Aug. 10, 2017

(51) Int. Cl.
*G06Q 50/18* (2012.01)
*G06Q 30/02* (2012.01)
*G06Q 30/06* (2012.01)
*G06Q 30/04* (2012.01)

(52) U.S. Cl.
CPC ....... *G06Q 50/184* (2013.01); *G06Q 30/0201* (2013.01); *G06Q 30/04* (2013.01); *G06Q 30/0645* (2013.01)

(58) Field of Classification Search
CPC ........... G06Q 630/0633; G06Q 20/102; G06Q 20/3223; G06Q 40/06; G06Q 10/063; G06Q 30/02; G06Q 10/107; G06Q 10/10; G06F 16/738; G06F 16/78; G06F 16/338; G06F 16/483; G06F 16/683; G06F 21/105
See application file for complete search history.

(56) References Cited

U.S. PATENT DOCUMENTS

| | | | |
|---|---|---|---|
| 8,862,620 B2 | 10/2014 | Klein, Jr. | |
| 2005/0039000 A1* | 2/2005 | Erickson | H04L 63/123 713/165 |
| 2007/0204118 A1* | 8/2007 | White | H04N 21/4334 711/159 |
| 2008/0016064 A1* | 1/2008 | Sareday | G06F 16/838 |
| 2009/0037975 A1* | 2/2009 | Ishikawa | G06F 21/105 726/1 |
| 2010/0306204 A1* | 12/2010 | Chitiveli | G06F 16/353 707/752 |
| 2013/0332400 A1 | 12/2013 | Gonzalez | |
| 2014/0040088 A1* | 2/2014 | King | G06F 21/10 705/35 |
| 2014/0143212 A1 | 5/2014 | Shumay | |
| 2015/0222950 A1* | 8/2015 | Sant | H04N 21/25883 725/18 |
| 2017/0034543 A1* | 2/2017 | Gerede | H04N 21/2393 |

* cited by examiner

*Primary Examiner* — Johann Y Choo
(74) *Attorney, Agent, or Firm* — Leading Edge Law Group, PLC

(57) ABSTRACT

A management system and method for usage data from usage logs of works of authorship is characterized by the comparison of data components from the usage logs to similar data components for works of authorship stored in a database. The usage data is normalized and cleaned prior to comparison, and additional information from the usage data can be extracted for later use in the comparison. False positive matches are eliminated from the comparison so that incompatible potential candidate matches are eliminated. In addition, the best match from a group of multiple matches is determined for a particular work from a usage log.

14 Claims, 2 Drawing Sheets

USAGE DATA MANAGEMENT SYSTEM AND METHOD

BACKGROUND OF THE INVENTION

SoundExchange is an independent nonprofit collective management organization that collects and distributes royalties for the use of sound recordings. Whenever a sound recording is performed pursuant to the statutory license set forth in Section 114 of the Copyright Act, royalties for the performance of that sound recording are due to the copyright owner, featured artist(s), and non-featured artist(s) of the sound recording, Service providers that perform sound recordings generally transmit playlist logs to SoundExchange that contain usage data or metadata information identifying each recording that was performed during a given period of time, such as over the course of a month. With thousands of service providers providing playlist logs of many different sound recordings on a regular basis, often without a sound recording identifier supplied in the recording metadata, it is tithe consuming and burdensome to identify a sound recording from metadata in the playlist logs in order to compile records of the number of performances of a particular sound recording and calculate the royalties owed for such sound recording. The present invention was developed to identify sound recordings from usage data logs provided by service providers. The same principles of the invention can also he used to identify usage or reproduction of various writings, paintings, photographs, or other works of authorship.

BRIEF DESCRIPTION OF THE PRIOR ART

It is known in the art to identify metadata associated with a media content file as disclosed in the Klein U.S. Pat. No. 8,862,620. It is also known in the art to determine the best match of a dataset of an artist identifier using a statistical classifier to calculate a probability that each artist identifier is associated with media items from two real world artists as disclosed in the Gonzalez US patent application publication No. 2013/0332400. The Shumay US patent application publication No. 2014/0143212 discloses a method for aggregating different provider identifiers to determine that different provider identifiers from different media providers refer to the same music track.

While these prior methods operate satisfactorily, none are capable of efficiently identifying and managing usage data from playlist logs from multiple sources to accurately account for the number of times a particular sound recording is performed or a work of authorship is displayed or reproduced in order to calculate the royalties due to an artist and copyright holder for that particular work. The present invention was developed in order to address these as well as other data usage management scenarios.

SUMMARY OF THE INVENTION

Accordingly, it is a primary object of the invention to provide a method and apparatus for processing and identifying copyrightable works listed in usage data from service providers. Usage data or metadata may comprise a playlist or log of copyrightable works performed or reproduced during a specific date range (transmission period). The authoritative metadata from a plurality of works is stored in a repertoire database and is utilized by a usage data management system and its automated matching process. The metadata in the repertoire database includes information from various components of the work. For example, for a sound recording, the metadata may represent the title, artist, label, album and a sound recording identification code. This repertoire database is updated frequently as new works of authorship are created, as original works are recorded or revised by different artists, or as recordings are re-released by rights owners in different products. Usage or playlist logs of what was performed, reproduced or displayed by service providers are delivered to an automated matching subsystem. The automated matching subsystem accesses a repertoire database to match the usage data against the authoritative repertoire rnetadata for identification.

The automated matching process initially cleans and normalizes the usage data for easier identification. Next, a number of properties of the work are extracted from the usage data. The normalized usage data from a playlist log is compared with previously stored metadata for the work in the repertoire database to determine a match for each of the works on the playlist log with one of the stored works, thereby to identify the work on the playlist log.

In a preferred embodiment, the invention is used to identify sound recordings from a playlist log. The components that make up the identifying metadata of sound recordings are various identifiers including artist name, title of the recording, title of the album of which the recording is a track, the marketing label for the album, and a sound recording identification code. During comparison of the usage data and stored metadata, separate criteria are used for each component, and a preference is given for stronger matches during the comparison.

In addition to normalization, the usage data is also cleaned of extraneous and irrelevant characters prior to the comparing step, thereby to make the comparison more accurate.

Additional information beyond the component information is also extracted from the usage data on the playlist logs. This additional information relates to sound recording version, genre, and recording date of the sound recording.

The method further includes the steps of eliminating incompatible potential candidate matches in order to eliminate false positive matches and determine a best match in the event of multiple matches determined for a particular sound recording from a playlist log.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
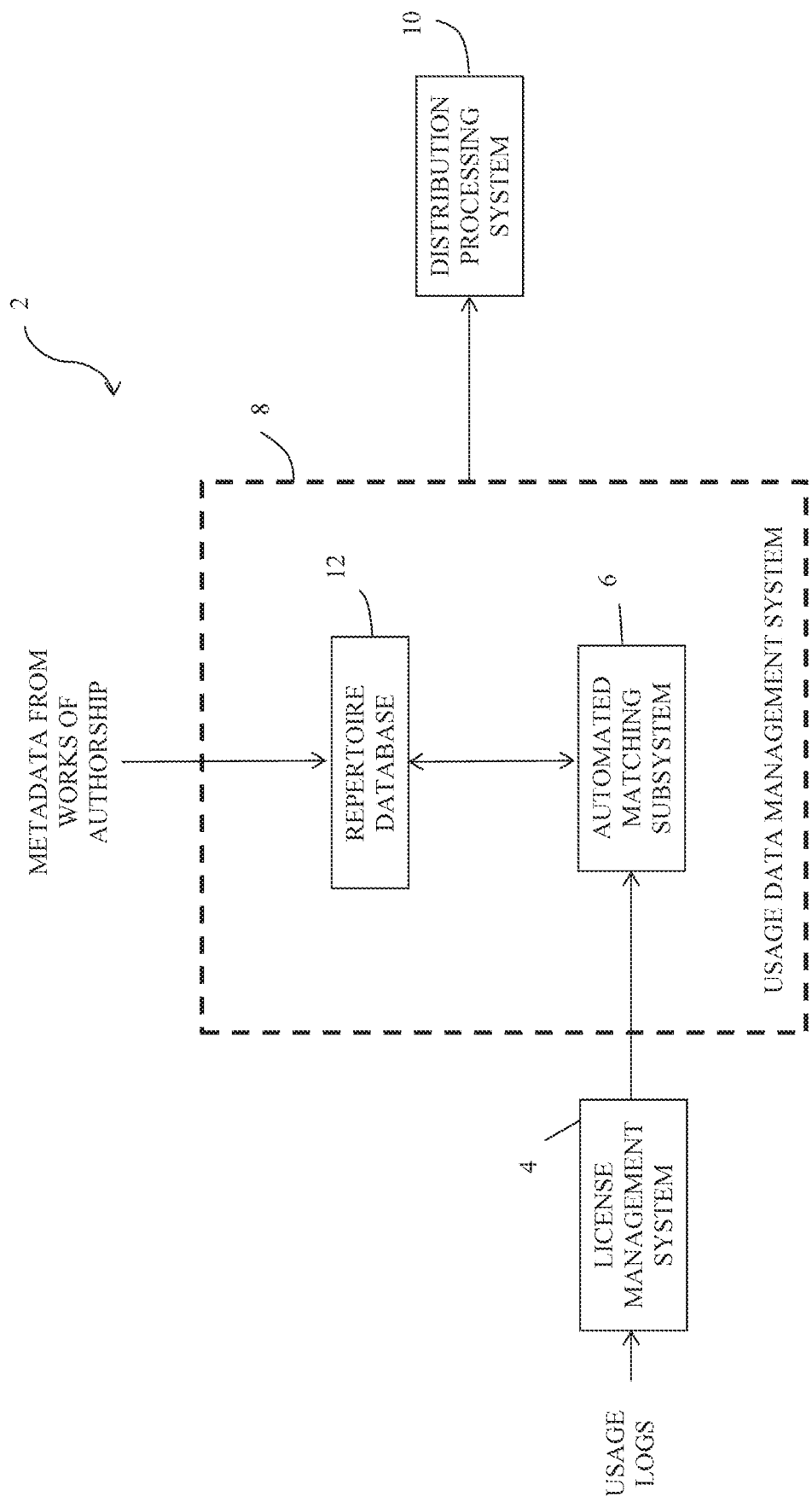
FIG. 1 is a block diagram of the usage data management system according to the invention.

The system 2 for managing incoming usage logs (also known as reports of use) from service providers will be described with reference to FIG. 1. The usage logs are delivered to a license management system 4. From the license management system, the logs are delivered to an automated matching subsystem 6 of a usage data management system 8 which attempts to identify the work of authorship referred to in the playlist. Such works may include sound recordings, photographs, paintings, motion pictures, textual works or any other copyrightable work of authorship. Once an item in the playlist usage log is identified, it is passed to the next system in a royalty administration platform, the distribution processing system 10.

The usage data management system 8 tries to identify the work by comparing or matching the incoming usage log data or metadata in a textual format against an internal master repertoire database 12 of the usage data management system. The master repertoire database is built from authoritative metadata in a textual format submitted by copyright owners and distributors relating to specific works of authorship. The database is continually and automatically updated with data relating to new works of authorship and updates for and revisions to existing works.

The usage data management system utilizes the automated matching subsystem and underlying algorithms to identify the items in the usage log. If the matching component does not automatically match the incoming work against the repertoire database, the system provides a user interface and workflow functionality for human experts to manually identify the works from the incoming usage log.

The automated matching subsystem 6 is connected with the licensee management system so that it can receive data from the playlist usage logs submitted from licensees. According to a preferred embodiment, the invention is particularly useful for identifying sound recordings from a playlist usage log presented by radio stations, broadcasters, or other entities that play sound recordings. For the purposes of identifying these sound recordings, the playlist usage logs contain all or some of the following component data fields:

| Featured Artist | Sound Recording Title | ISRC | Album Title | Marketing Label |
|---|---|---|---|---|
| Name of the featured artist, as listed on the commercially released recording | Title of the track, as listed on the commercially released recording | The International Standard Recording Code for the sound recording | The sound recording's album name | The sound recording's marketing label |

Licensees are required to provide artist, recording title, and either the International Standard Recording Code (ISRC) or, if no ISRC is available, the album title and marketing label. From this usage information, the automated matching subsystem attempts to identify the commercial sound recordings that were played by the licensed service as reflected by the playlist log.

Figure 2:
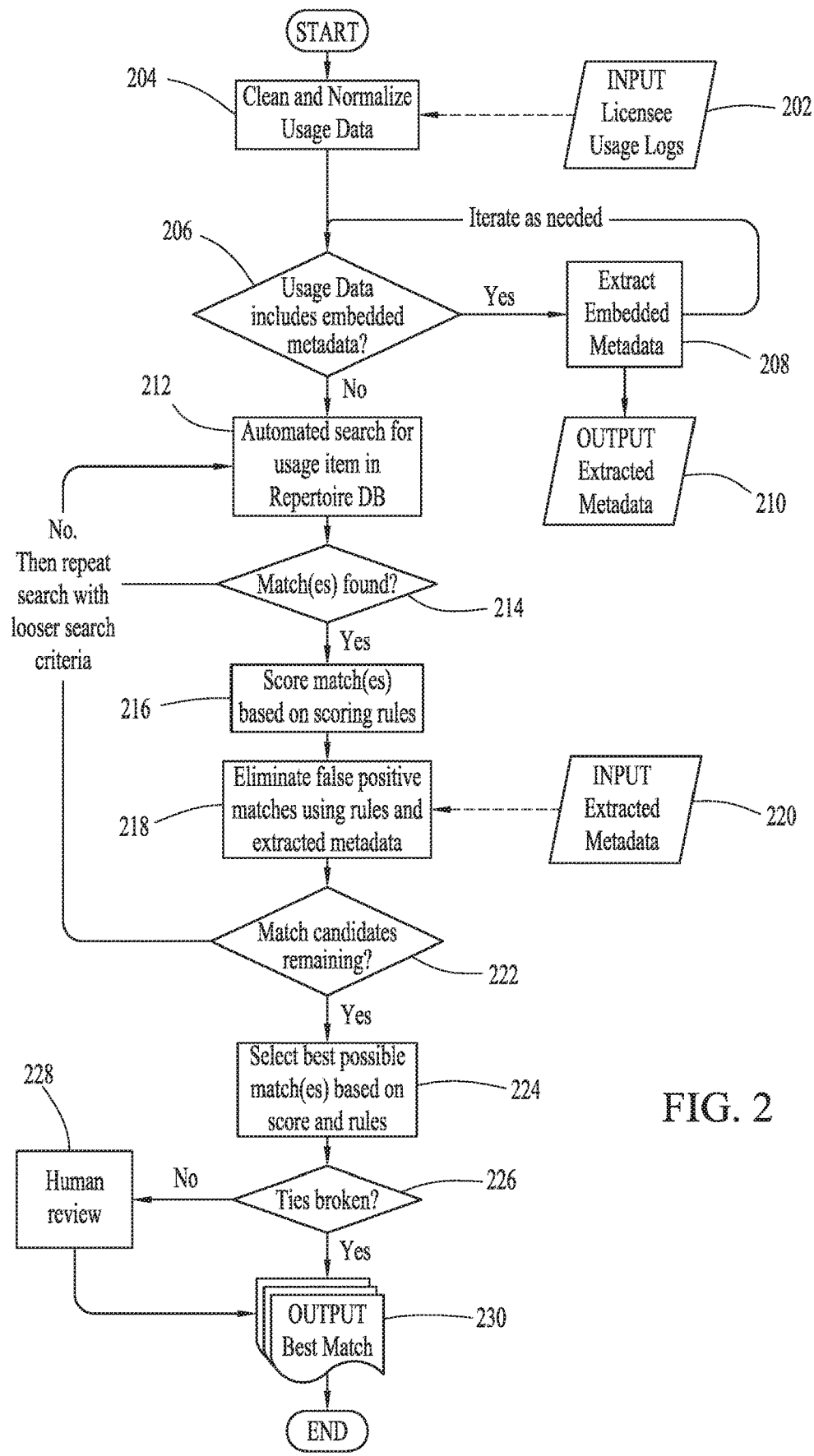
FIG. 2 is a flow chart showing the sequence of steps performed in the usage date management method.

The method for identifying a recording from the usage data in a playlist log will be described with reference to FIG. 2. While this description is directed to identification of sound recording from a playlist log, it will be readily apparent to those of ordinary skill in the art that the same method steps can be used to identify any work of authorship, the metadata of which has been stored in a repertoire database.

Licensee playlist usage logs are input at step 202. The usage data is cleaned and normalized at step 204. Although this step is shown as being a single step, it will be readily apparent to those skilled in the art that the steps may be performed separately. The cleaning and normalization is performed by the automated matching subsystem which takes the input usage data and removes extraneous and irrelevant characters, converts mixed case characters to all lower case, normalizes punctuation and article words, and breaks apart artist names.

1. Example 1

| Licensee-provided Recording Title | Cleaned and normalized Recording Title |
|---|---|
| ^And Justice For All.mp3^ | and justice for all |

2. Example 2

| Licensee-provided Feature Artist | Cleaned and normalized Feature Artist |
|---|---|
| Rihanna & Jay Z | rihanna, jay z |
| Missy Elliot FEAT. Beyoncé | missy elliot, beyonce |

The cleaned and normalized data facilitates comparison of component data as will be described in greater detail below.

After the cleaning and normalization step, the automated matching subsystem analyzes the usage data to determine if it includes embedded metadata at step 206. If so, the subsystem extracts as many distinct recording properties or components in the form of metadata fields as possible at step 208. More particularly, there is additional useful identifying information embedded in the five component data fields provided by licensees as discussed above. This additional identifying information is additional metadata about the recording including but not limited to sound recording version, genre, and recording date. Through the use of an automated matching algorithm, the text of the supplied usage data is parsed, and the algorithm extracts any additional sound recording properties. The algorithm is able to detect redundant and overlapping properties (e.g., "Live" embedded in recording title and album title).

The additional identifying information or properties can be embedded in various places in the submitted recording metadata. The data extraction algorithm parses the text and searches for patterns in the text that may indicate an embedded property (i.e., common word for recording property embedded in recording title and inside of parentheses). The automated matching subsystem uses an ontology of sound recording properties (taxonomy of sound recording title terms) in conjunction with auto-generated regular expression code to execute text searches to identify and extract additional recording properties from the submitted playlist data.

The process removes the extracted properties from the normalized form of the submitted playlist metadata in order to improve the likelihood of finding potential matches when matching against the repertoire database. The extracted property data are output at step 210 and utilized later in the matching process.

3. Example 3: Recording Version Embedded in and Extracted from the Recording Title (e.g., Remix, Live, Acoustic, Studio Version, Explicit, Radio Edit)

| Licensee-provided Recording Title | Extracted Additional Recording Property |
| --- | --- |
| Master of Puppets (LIVE) | live |
| Rapper's Delight (Radio Edit) | radio edit |

After extraction, the automated matching subsystem performs an automated search of the playlist usage data against data in the repertoire database at step 212. The automated matching process compares the cleaned and normalized playlist usage data to data in the repertoire database to find candidate or potential matching sound recordings. Preference is given to recordings with matching or similar featured artists/collaborators, sound recording titles, and sound recording versions. The matching process is flexible enough to accommodate mis-typed words and names and other data anomalies.

There are four data fields currently used for sound recording identification: featured artist, sound recording title or track, album, and ISRC. Other than ISRC (which requires an exact match to be considered a match), the matching process requires a combination of at least two matching methods for a particular repertoire item to be considered a candidate match to a playlist log item at step 214. The process scores and ranks the matches at step 216 into approximately four to five identification tiers ranked high-to-low for each of the possible matching data fields. For example, "track_match_with_minimal_transformations" is the highest ranked track identification tier and "track_match_with_wildcard" is one of the lower ranked track identification tiers.

There are several types of matching algorithms for each of the components or data fields/identification types (track, artist, album, ISRC). The matching algorithms are customized to the data type. For instance, the algorithm for a featured artist name is different than the algorithm for a track title. Each of the appropriate matching algorithms is run for each data field. When searching for match candidates, the process computes every possible match permutation, i. e., different permutations of the search fields. If no matches are found, the search is repeated with looser search criteria. The process gives preference to stronger matches by running with the highest-scoring permutations first, until it finds a strong candidate match or matches.

The resulting candidate or potential matches are assigned a score that is equal to the sum of the highest matching identification values for each of the components or identification types (track, artist, album, ISRC). A match above a certain threshold does not require human review if it also passes false-positive detection tests. A matching score below the threshold requires human review via a usage data management user interface and workflow process.

After a candidate match is identified, the matching process runs a suite of false positive detection rules on each candidate match at step 218 to determine whether the match is a false positive match or requires human review. This step is necessary because of the unstructured nature of sound recording and playlist data and the potential risk of match identification inaccuracies. The biggest area of risk is misinterpreting sound recording title versions, i.e. acoustic, live, or original.

The matching process executes a series of false detection checks based on a set of business rules. These business rules are based on the analysis of the playlist and repertoire data and the matching process results to date.

This step in the matching process utilizes the recording properties extracted earlier at step 210 which are input at step 220. The matching process maintains an ontology of sound recording property terms. The ontology includes a weighting of certain terms which are considered stronger characteristics than others. For example, the track or album title term "acoustic" is a more significant matching characteristic than the term "radio edit". The ontology and weighting of terms is based on extensive analysis of the data received to date and testing of the matching process.

Following the step to eliminate potential false positive matches, a determination is made at step 222 if there are any match candidates remaining. If not, the search is repeated with less stringent search criteria. If there are multiple candidate matches, the process enters a tie-breaker phase to select the best possible match at step 224.

The tie-breaker step is required when there are multiple high confidence matches remaining. This occurs due to either the track title data being ambiguous which causes multiple, good match candidates and/or there are nearly equivalent recordings in the repertoire database which have similar metadata. In this situation, the matching process attempts to break the tie. It should be noted that any of the potential matches would be considered a good match in isolation. If a tie cannot be broken confidently at step 226, then it will be put in front of a human to review at step 228.

In general, matches with a higher identification score and/or aligning recording properties will win when breaking a tie. If necessary, the tie-breaker logic is determined by walking through a decision tree (hierarchy of rules) until a winner and loser are determined. After the tie is broken, the best matches are output at step 230.

As set forth above, the invention may be used to identify works of authorship other than sound recordings. For a musical composition, representative metadata used for identification includes the title of the composition, the name of the composer and/or songwriter, the publisher, and the identification code for the composition. For an audio visual work, representative metadata used for identification includes an artist name, title of the work, an audio visual identification code, a recording album, and a marketing label. For a photograph, representative metadata used for identification includes the title of the photograph, the name of the photographer, the company name and a photograph identification code.

The usage matching component of the invention has been designed and built for high performance processing. In order to meet business objectives for near real-time processing, the matching component was implemented with several performance optimizations.

Processing dozens of complex regular expressions on each and every playlist data item can run very slowly. Tens of millions of rows of sound recording playlist data are typically received from licensees every month. The technical implementation of user data management according to the invention has been designed to account for processing large volumes of data in a short period of time. Accordingly, the usage data management system combines similar regular expressions together so that they can be run in parallel. Without running regular expressions in parallel, the processing time would not be feasible to meet operational expectations. However, by combining the regular expression logic and processing, the amount of code to execute becomes quite large. While most regex code libraries would perform poorly with such large patterns, a third party regular expression processing engine such as Google's re2 engine optimized for processing large regex patterns can be used.

In addition, during match identification, with roughly 4-5 tiers per search field, there are up to one hundred search queries due to all of the permutations. The usage data management system utilizes an open source-based search engine to assist in solving this technical challenge. The usage data management system takes advantage of the search engine caching of sub-queries. Even though the system might make more than one hundred search queries during the identification process, internally the search engine only has to make around a dozen, and the rest of the processing is simply set intersections which are done in memory. This in-memory approach to searching, versus requiring disk input/output, dramatically improves the processing time of the search step.

While the preferred forms and embodiments of the invention have been illustrated and described, it will be apparent to those of ordinary skill in the art that various changes and modifications may be made without deviating from the inventive concepts set forth above.

What is claimed is:

1. A system for managing usage text-based metadata from a usage log of a plurality of works of authorship from a service provider, comprising
   (a) a usage data management system containing a database of text-based authoritative metadata from a plurality of works of authorship, said text-based authoritative metadata including at least one field of text-based metadata corresponding with at least one of an author name, a title, a work identification code, a recording album, a publisher name, and a marketing label of the works of authorship in the database;
   (b) a license management system which contains the usage logs from each of the service providers, said usage logs including text-based usage metadata including at least one field of text-based metadata corresponding with at least one of an author name, a title, a work identification code, a recording album, a publisher name, and a marketing label of each of the works of authorship being reproduced by each service provider; and
   (c) an automated matching subsystem arranged within said usage data management system and in communication with said license management system, wherein said automated matching subsystem
     (1) cleans and normalizes the text-based usage metadata;
     (2) compares each field of said text-based usage metadata from the usage logs against each corresponding field of said text-based authoritative metadata from said usage data management system using a separate matching algorithm for each field of text-based metadata to produce a matching identification value for each comparison;
     (3) repeats the comparison step for each field of text-based metadata until a strong candidate match is found;
     (4) sums the highest matching identification values for each field of text-based metadata to obtain a total matching score;
     (5) compares the total matching score with a threshold score for each field of text-based metadata; and
     (6) determines a match for each work of authorship on the usage log with a stored work of authorship in the database when at least one total matching score exceeds a threshold score for each field of text-based metadate, thereby to identify each work of authorship from the usage logs.

2. A system as defined in claim 1, wherein said automated matching subsystem assigns weights to certain components of each of the works of authorship used to achieve said threshold matching score.

3. A system as defined in claim 2, wherein said automated matching subsystem determines an optimum match corresponding to said threshold matching score from a plurality of possible matches after comparing said text-based usage metadata with said text-based authoritative metadata.

4. A system as defined in claim 3, and further comprising a distribution processing system in communication with said usage data management system.

5. A system as defined in claim 4, wherein each of said works of authorship include at least one of a sound recording, a musical composition, an audio visual work and a photograph.

6. A method for managing text-based usage metadata from a usage log of a plurality of works of authorship from a service provider, comprising the steps of
   (a) storing, by a usage data management system, text-based authoritative metadata from a plurality of works of authorship in a database in the usage data management system, said text-based authoritative metadata including at least one field of text-based metadata corresponding with at least one of an author name, a title, a work identification code, a recording album, a publisher name, and a marketing label of the works of authorship in the database;
   (b) normalizing, by an automated matching subsystem, the text-based usage metadata from the usage log said text-based usage metadata including at least one field of text-based metadata corresponding with at least one of an author name, a title, a work identification code, a recording album, a publisher name, and a marketing label of each of the works of authorship being reproduced by each service provider;
   (c) extracting, by the automated matching subsystem, a plurality of properties from the normalized text-based usage metadata after said normalizing step, said extracting step identifying additional information from the normalized text-based usage metadata independent of at least one of the author name, the title, the work identification code, the recording album, the publisher name, and the marketing label;
   (d) comparing, by the automated matching subsystem, each field of the normalized text-based usage metadata from the usage log against each corresponding field of previously stored text-based authoritative metadata from the database using a separate matching algorithm for each field of text-based metadata to produce a matching identification value for each comparison;
   (e) repeating said comparison step for each field of text-based metadata until a strong candidate match is found;
   (f) summing the highest matching identification values for each field of text-based metadata to obtain a total matching score;
   (g) comparing said total matching score with a threshold score for each field of text-based metadata; and
   (h) determining a match for each work of authorship on the usage log with a stored work of authorship in the database when at least one total matching score exceeds a threshold score for each field of text-based metadata, thereby to identify each of the works of authorship on the usage log.

7. A method as defined in claim 6, wherein said metadata comparing step utilizes separate criteria for each field of text-based metadata.

8. A method as defined in claim 7, wherein a preference is given for stronger matches during said score comparing step.

9. A method as defined in claim 6, and further comprising the step of cleaning the text-based usage metadata by the automated matching subsystem to remove extraneous and irrelevant characters prior to said comparing step.

10. A method as defined in claim 6, and further comprising the step of eliminating incompatible potential candidate matches by the automated matching subsystem to eliminate false positive matches.

11. A method as defined in claim 10, and further comprising the step of determining a best match by the automated matching subsystem in the event of multiple matches determined for a particular sound recording from a playlist log.

12. A method as defined in claim 6, wherein each of said works of authorship includes at least one of a sound recording, a musical composition, an audio visual work and a photograph.

13. A method as defined in claim 6, wherein said extracting step comprises extracting additional information from the normalized text-based usage metadata by the automated matching subsystem after said normalizing step.

14. A method as defined in claim 6, and further comprising the step of providing human review of matches having a total matching score below said threshold score.

* * * * *